(12) United States Patent
Smith

(10) Patent No.: US 6,685,571 B1
(45) Date of Patent: Feb. 3, 2004

(54) CONSTANT VELOCITY UNIVERSAL JOINT AND METHOD OF PRODUCING

(76) Inventor: Fred Edmund Smith, 18290 E. 2360th Rd., Bushnell, IL (US) 61422

(*) Notice: Subject to any disclaimer, the term of this patent is extended or adjusted under 35 U.S.C. 154(b) by 9 days.

(21) Appl. No.: 10/231,668

(22) Filed: Aug. 30, 2002

(51) Int. Cl.⁷ .................................................. F16D 3/16
(52) U.S. Cl. ........................................ 464/141; 464/906
(58) Field of Search ................................. 464/139, 141, 464/185, 904, 906

(56) References Cited

U.S. PATENT DOCUMENTS

| | | | |
|---|---|---|---|
| 1,121,144 A | 12/1914 | Sponsel | |
| 1,665,280 A | 4/1928 | Rzeppa | |
| 1,673,492 A | * 6/1928 | Boughton | 464/142 |
| 1,677,311 A | * 7/1928 | Weiss | 464/142 |
| 1,918,613 A | 7/1933 | Peters | |
| 1,975,758 A | 10/1934 | Stuber | |
| 1,985,278 A | 12/1934 | Bradley | |
| 2,010,899 A | 8/1935 | Rzeppa | |
| 2,046,584 A | 7/1936 | Rzeppa | |
| 2,047,660 A | 7/1936 | Anderson | |
| 2,134,563 A | * 10/1938 | Koppel | 464/142 |
| 2,239,675 A | 4/1941 | Hanft | |
| 2,286,498 A | * 6/1942 | Miller, Jr. | 464/142 |
| 2,319,100 A | 5/1943 | Anderson | |
| 2,352,776 A | 7/1944 | Dodge | |
| 2,911,805 A | 11/1959 | Wildhaber | |
| 3,464,232 A | 9/1969 | Hutchinson | |
| 3,802,221 A | * 4/1974 | Kimata | 464/141 |
| 4,078,400 A | * 3/1978 | Krude | 464/145 |
| 4,832,657 A | * 5/1989 | Hahn | 464/141 |
| 5,797,801 A | 8/1998 | Jacob | |
| 5,852,864 A | 12/1998 | Krude | |
| 6,042,479 A | 3/2000 | Hopson | |
| 6,071,195 A | 6/2000 | Krude | |
| 6,120,382 A | 9/2000 | Sone | |
| 6,135,891 A | 10/2000 | Sone | |
| 6,149,524 A | 11/2000 | Jacob | |
| 6,159,103 A | 12/2000 | Lu | |
| 6,186,899 B1 | 2/2001 | Thomas | |

\* cited by examiner

Primary Examiner—Lynne H. Browne
Assistant Examiner—Kenn Thompson

(57) ABSTRACT

My universal joint will use the outer and inner members to hold the balls in alignment. The male or female part would hold the ball in a half spherical recess and the other component would have a race groove to allow movement. It will also have means of attachment on each end with both ends being integral components of the final product. The male and female components could be made out of a pipe, tube, bar or cylinder of any length desired. The male component could consist of the unit holding 3 balls. This method would turn the friction wear of a rubbing surface into a rolling movement that would allow more speed of motion and less vibration. If necessary, in order to provide more bearing surface, increase torque, speed and reduce vibrations, it would be possible to use several paired ball tracks and ball seats. The center ball would impart rolling movement to all balls in contact with the ball race. This is a new and novel method to help reduce wear and friction, maintain ball relationship and eliminate the need for a cage to hold the balls.

5 Claims, 5 Drawing Sheets

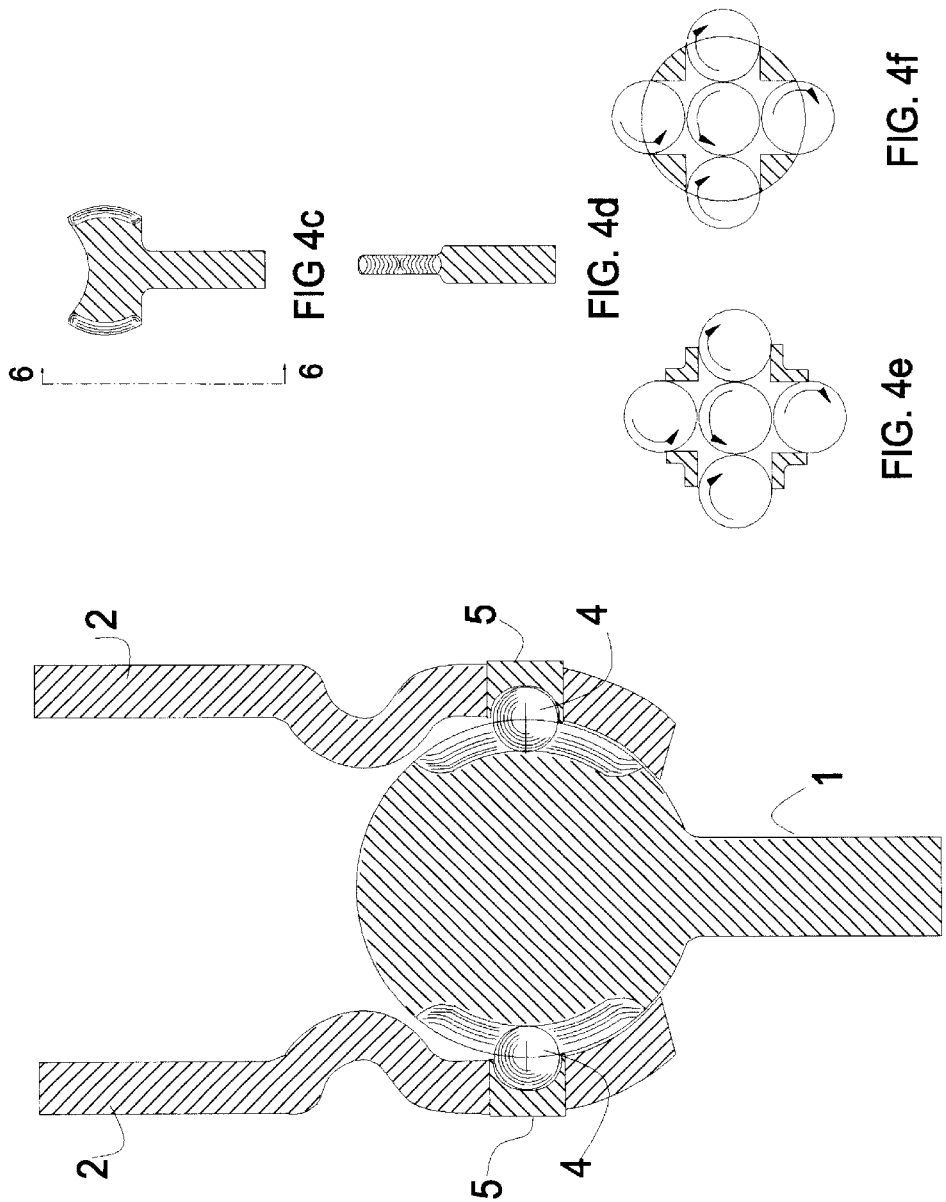

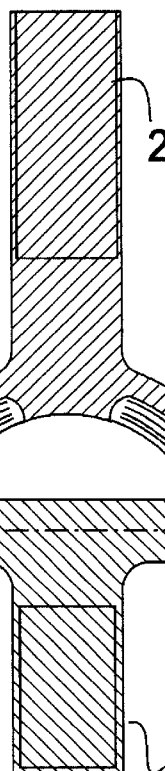
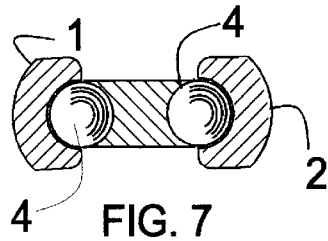
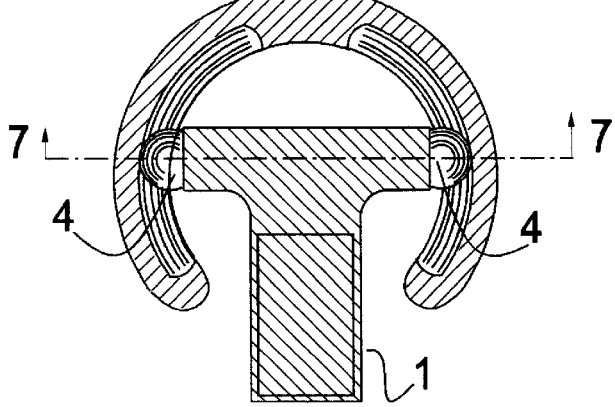
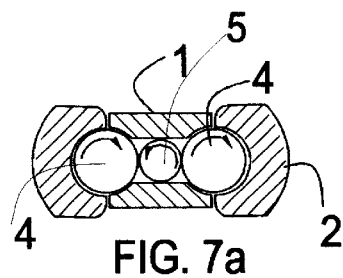
FIG. 7
FIG. 7a
FIG. 6
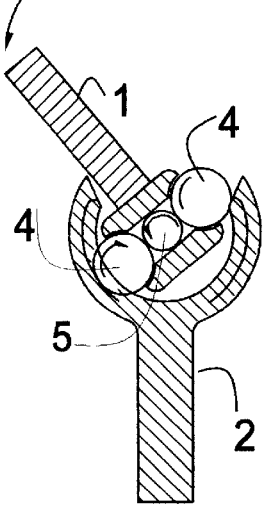
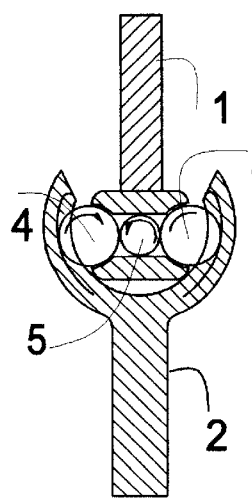
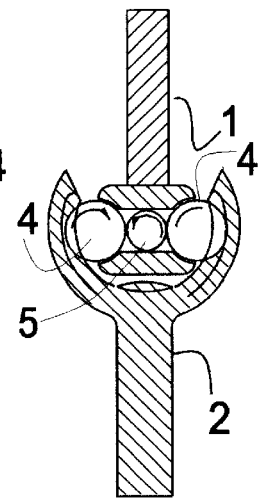
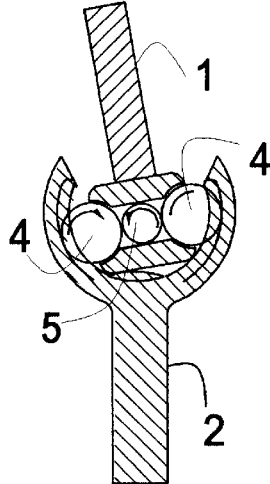
FIG. 8a  FIG. 8b  FIG. 8c  FIG. 8d

CONSTANT VELOCITY UNIVERSAL JOINT AND METHOD OF PRODUCING

BACKGROUND OF THE INVENTION

1. Field of the Invention

This invention relates to constant velocity universal joints of the type wherein torque is transmitted from one of the joint elements to the other through the medium of balls operating in grooves or raceways formed in either the outer or inner housing. The invention relates particularly to joints wherein the raceways extend diagonally in a generally axial direction, with the raceways either in the male or female housing and a half spherical ball retainer in the other housing. The one pair in crossed relationship to each other and with a torque-transmitting ball located in the half spherical ball retainer housing and rolling in the mating raceway.

Its general object is to provide a relatively inexpensive joint with no internal cage to hold the balls, that will handle loads at a slower speed and be easy and cost effective to manufacture.

2. Description of Related Art

The main problem that all of the past constructions have addressed is changing the linear direction of a circular motion. The need was to apply a circular motion from a fixed position and then change the linear direction. There are several considerations in how to apply and change this force. Some of the considerations are; how much torque are you transmitting, how much change of direction is needed, how constant and vibration free is the motion, how much speed of motion will be required, what is the cost and ease of production.

There have been 2 main types of devices that have addressed these issues. The first is the universal joint that consists of 2 yokes with a cross connected in the middle. FIG. 1 in U.S. Pat. No. 1,121,144 dated Dec. 15th, 1914 and FIG. 1 in U.S. Pat. No. 1,918,613 dated Jul. 18th, 1933 both show this type. This cross type universal joint was good at delivering high torque forces and large angles of change in direction. Many of the improvements made have revolved around lubrication and ease of manufacture. U.S. Pat. Nos. 3,832,865 and 5,389,039 have both addressed these issues. The main problem with this method is non-constant motion, vibration, many component parts, and cost of production.

The second type is the constant velocity universal ball joint typically having an outer joint member having a plurality of inward facing ball grooves, an inner Joint member having a plurality of outward facing ball grooves and a cage between the two that aligns the balls to hold them in place. The balls, held in place by the cage, in conjunction with the grooves, provide the motive to transmit the force. The constant velocity universal ball joint has been very good at delivering a constant force with low vibration. Most improvements have dealt with lubrication and design of the cage to hold the balls in their proper positions. The following patent prints have addressed some of these problems; FIG. 1 of U.S. Pat. Nos. 1,665,280, 1,975,758, 1,985,278, 2,010, 899, 2,047,660, 2,352,776, 2,319,100, 3,464,232, 5,797,801, 6,042,479, 6,149,524, 6,186,899 and FIG. 9 of U.S. Pat. No. 2,046,584, FIG. 2 of U.S. Pat. No. 2,911,805, FIG. 4 of U.S. Pat. No. 5,852,864, FIG. 2a of U.S. Pat. No. 6,071,195, FIG. 1a of U.S. Pat. No. 6,120,382, and FIG. 6a of U.S. Pat. No. 6,135,891. Unless the constant velocity universal ball joint is used in conjunction with other items, the main problems have been limited change of direction, some limit on amount of torque transmitted, many component parts and cost of production.

SUMMARY OF THE INVENTION

The primary objective is to provide a relatively inexpensive joint that will handle loads at moderate speeds, provide a change of direction and be easy and cost effective to manufacture. My universal joint will use the outer and inner members to hold the balls in alignment. This would be done with one holding the ball in a half spherical recess and the other component having a race groove to allow movement. My universal joint will also have means of attachment on each end with both ends being integral components of the final product. In the past, the joint has been made and then attached to other components to provide the motion and provide for the distance needed. In my joint, the outer and inner members could be made as part of the connecting apparatus. The outer part could be made out of a pipe, tube, bar or cylinder of any length desired. The inner component could also be made from a similar material of any length. If no great distance in needed, but there is a need for considerable change in direction, several joints could be assembled together as shown in FIGS. 10 and 11.

The preferred embodiment of the invention would consist of a cylinder that has component parts as shown in FIG. 1. The cylinder could be replaced by the use of bar stock that has been formed or machined on the end. With the use of 2 block 3s' as depicted in FIG. 3a, the inner component could consist of the unit holding 3 balls as depicted in FIG. 7a. This method would turn the friction wear of a rubbing surface into a rolling movement that would allow more speed of motion and less vibration. Use of a smaller ball as shown in FIG. 7a, would be needed to constrain the side motion allowed on the balls. If necessary, in order to provide more bearing surface, increase torque, speed and reduce vibrations, it would be possible to use 2 paired ball race tracks and ball seats as shown in FIGS. 4e and 4f. The blocks called 3 in FIG. 1 would then have a total of 4 groove races to allow movement of the four balls. In the instance of method of manufacture as shown in FIGS. 12 and 13, the grooves would be formed in the end of item 2. Balls would then be assembled and the end formed over to hold item 1, holding the balls as seen in FIGS. 14 and 15. This is a new and novel method to help reduce wear and friction, maintain ball relationship and eliminate the need for a cage to hold the balls. In high volume not needing long distances for coupling, the preferred method of construction would be as shown in FIGS. 8a–8d. The method of assembly would allow the use of only 2 balls in their respective race grooves as shown in FIG. 7. The center ball depicted in FIG. 7a would still be possible if the added benefits of the rolling movement are needed in the application. FIGS. 8a, 8b, 8c, and 8d show a novel way of assembling the components per the embodiment in FIG. 6.

BRIEF DESCRIPTION OF THE DRAWINGS

FIG. 1 would have the block 3 per FIG.3a.

FIG. 1a would have the block 3 per FIG. 3a. This embodiment would allow rolling motion on the balls rather than sliding motion as explained later.

FIG. 4b shows an embodiment of the internal part 1 that would hold the balls in place rather than the ball stud depicted in FIG. 4a.

FIG. 4c shows an embodiment of the internal part 1 that could replace the ball stud design. The raceway would be in this formed part and the ball retainer would be in the external part per FIG. 3.

FIG. 4d is a section taken along line 6—6 in FIG. 4c.

FIG. 4e is a cross section of item 1 showing the use of 4 balls for movement and a center ball to change surface friction to a rolling motion.

FIG. 4f is a cross section of item 1 showing the use of 4 balls for movement and a center ball to change surface friction to a rolling motion. This would be a round ball stud that is further machined to accept the 4 balls and the center ball.

FIG. 5 is an axial section of a preferred embodiment of my constant velocity joint according to this invention, the section taken through the pair of opposing balls.

FIG. 6 is an axial section of a preferred embodiment of my constant velocity joint according to this invention, the section taken through the pair of opposing balls.

FIG. 7 is a section taken along line 7—7 in FIG. 6.

FIG. 7a depicts an improvement of 3 balls, with the center ball being smaller than the 2 balls engaging the movement. The use of the smaller ball would constrain the side motion allowed on the balls.

FIGS. 8a, 8b, 8c, 8d show an improved method of assembly for the preferred embodiment shown in FIG. 6.

DETAILED DESCRIPTION OF THE INVENTION

Figure 4:
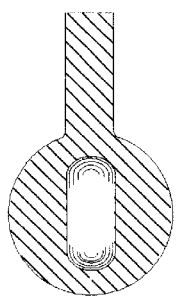
FIG. 4 shows an embodiment of the internal ball stud 1, with the raceway to allow movement of the ball. With this ball stud 1, Block 3 would be per FIG. 3.
Figure 4A:
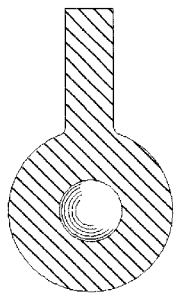
FIG. 4a shows an embodiment of the internal ball stud 1, with the ball retainer hole to accept the ball per FIG. 1.
Figure 4B:
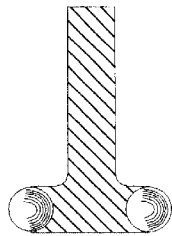
Figure 2:
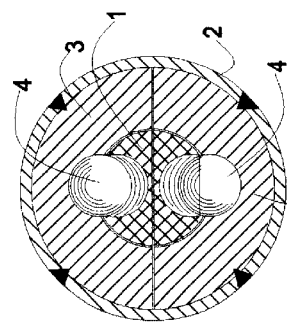
FIG. 2 is a section taken along line 2—2 in FIG. 1.
Figure 3A:
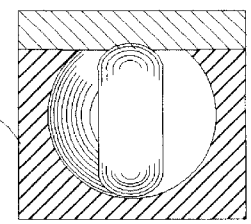
FIG. 3a is a section taken along line 3—3 in FIG. 1.
Figure 3:
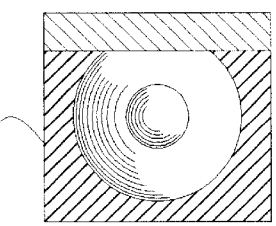
FIG. 3 is a section taken along line 3—3 in FIG. 1 except it shows the placement of a half spherical ball retainer in place of the ball raceway.
Figure 1:
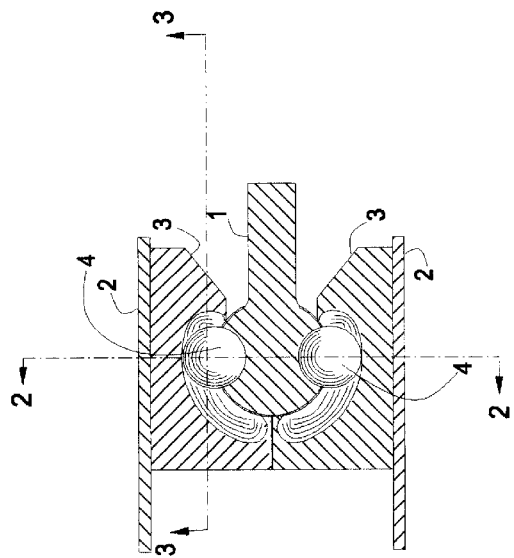
FIG. 1 is an axial section of the preferred embodiment of my constant velocity joint according to this invention, the section taken through the pair of opposing balls.
Figure 1A:
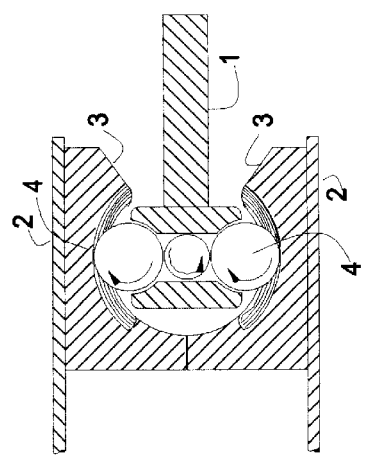
FIG. 1a is an axial section of the preferred embodiment of my constant velocity joint according to this invention, the section taken through the pair of opposing balls.

Refer now to FIG. 1, which is an overall drawing of a preferred embodiment of the invention. First, the basic arrangement will be described with reference to FIGS. 2, 3, 3a, 4, 4a, 4b and 9. Blocks 3 can either have the half spherical ball retainer as shown in FIG. 3 or could have the ball groove depicted in FIG. 3a. The part shown as 1 in FIG. 1 could also have either the half spherical ball retainer as shown in FIG. 4a or could have the ball groove depicted in FIG. 4. If the ball half spherical ball retainer is in part 3, the part 2 would have the groove race way. There must be a pairing of mating ball retainers and ball grooves. I formulate one pair only in order to have a less expensive joint. Additional pairs could be added, which would increase the cost but lead to increased load bearing and less vibration. Type of manufacture and ideas shown could be used with additional pairings. FIG. 4b would show one of many other forms that item 1 could take. Item 2 would be a pipe, tube or cylinder with the correct internal diameter to accept 2 items 3, 1 item 1 and 2 spherical balls item 4. This item 2 could be of any reasonable length based only on the ability to handle the material. The items would be inserted into item 2 and then affixed. This could be done by permanent means such as staking as shown in FIG. 2, dimpling, welding, or could be done in a manner to allow disassembly such as set screws or pins. The grooves should be made to allow a small cavity at the bottom to accept a lubricant. The balls are retained in the ball sockets and rotate in the ball grooves. The force is applied through each ball during the transmission of power through the joint. The strength of the joint can be calculated based on the cross sectional strength of the balls. Relieving the bottom of the ball grooves not only allows lubrication, but also limits the contact of the torque transmitting balls to the outer areas only of the grooves. This not only insures a relatively long line of contact between each ball and its corresponding groove, but also decreases the radial component of the force being transmitted through the balls to a lower value. The 2 grooves are longitudinally accurate, that is, a plane bisecting the groves longitudinally will describe an arc, and the center of the arc of each groove will be offset from the center of the arcs of the corresponding ball holder socket, the center of the main members being preferably there between when the main members are aligned. In this case, the groove forms the wedging surface which resists improper displacement of the ball. The frictional force exerted upon the balls during the movement of one of the shafts relative to the other will cause the balls to roll and in rolling will move the centers of the balls a distance equal to one half the angular distance between normally oppositely disposed points on the exterior surface of the ball member and the interior surface of the ball socket. The balls thus move back and forth in the groves in a cycle synchronized with the rotation of the joint. The use of three balls as shown in FIG. 7a and FIG. 1a would help relieve much of the friction. This would allow more speed and torque to be applied with less vibration.

Figure 9:
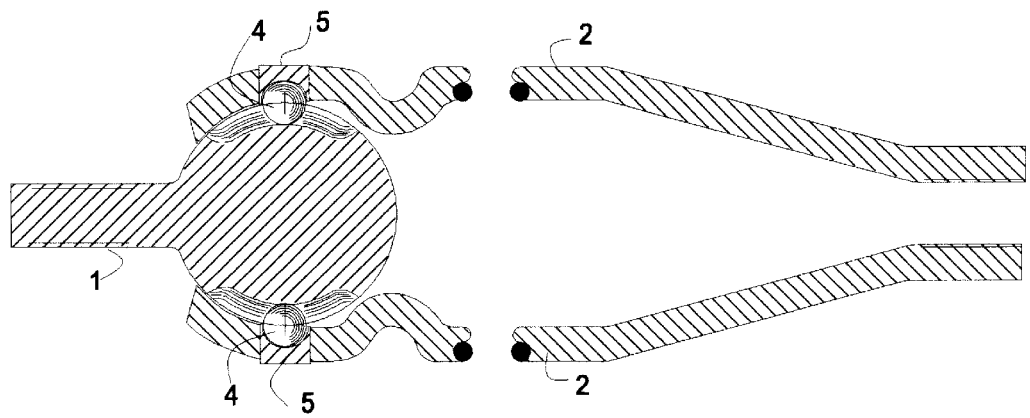
FIG. 9 is an axial section of a preferred embodiment of my constant velocity joint according to this invention, the section taken through the pair of opposing balls. This FIG. 9 also shows a swaged and tapped attachment point for component 2 and a threaded ball stud component 1. Notice that the component 1 and 2 could be of any reasonable length.
Figure 14:
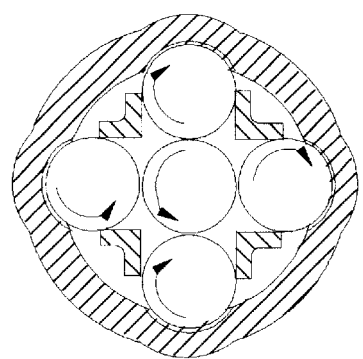
FIG. 14 is a section taken along line F—F in FIG. 12 with the addition of formed ball race grooves and the addition of FIG. 4e item 1 detail.
Figure 15:
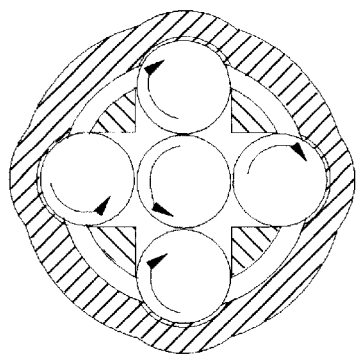
FIG. 15 is a section taken along line F—F in FIG. 12 with the addition of formed ball race grooves and the addition of FIG. 4f item 1 detail.
Figure 12:
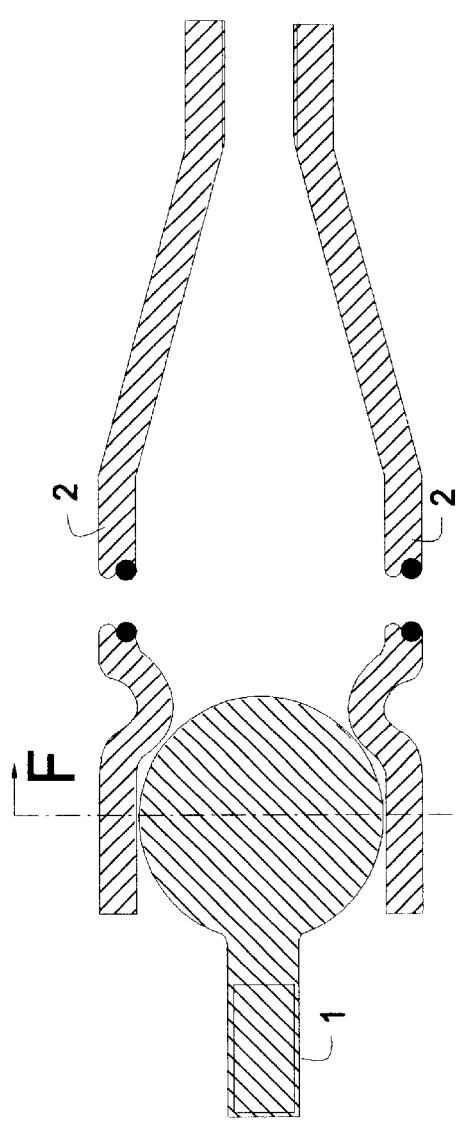
FIG. 12 is a cross sectional drawing showing one method of assembly and construction.
Figure 13:
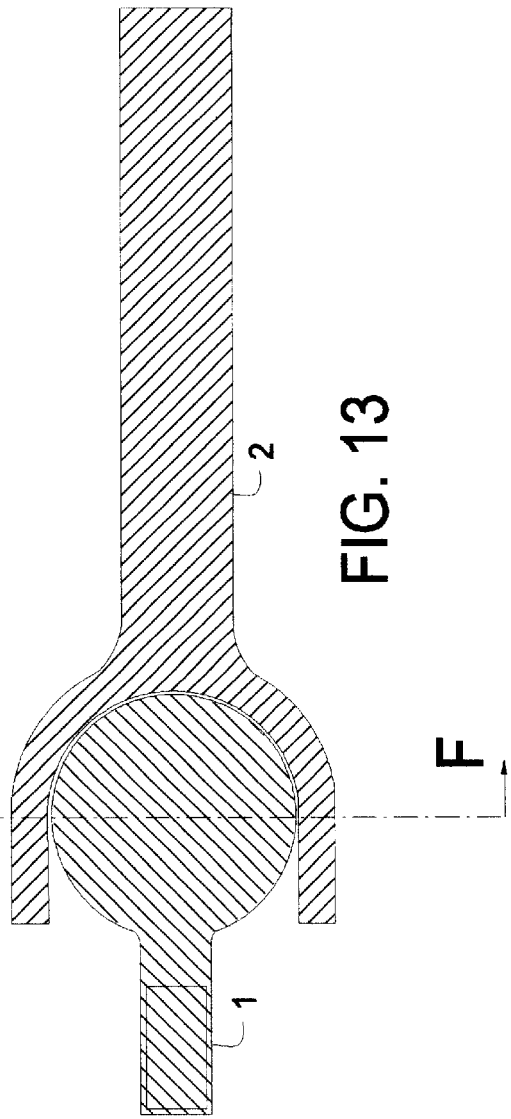
FIG. 13 is a cross sectional drawing showing one method of assembly and construction.

An alternative embodiment would use the material for one of the shafts as the material to hold the torque transmitting balls. FIGS. 12 and 13 show how this would be done. If a hollow cylinder, pipe or tube is used, the end would be formed to limit the member 1 travel back into the socket. The item 1 as shown in either FIGS. 4, 4c or 4d could then be inserted in the end. The ends would then be formed in a manner to retain the item 1. The item 1 and 2 parts could be assembled before or after the ball retaining process is done. The part could be assembled with the balls and retainers and then formed on the end to hold together or machined after the parts 1 and 2 are assembled and then the balls would be inserted. FIG. 5 shows the assembled part with FIG. 9 showing several methods to provide attachment. Items 1 or 2 could be provided with internal or external threads. Other methods of attachment could be used as know by the industry. I feel this embodiment would be better with the item 2 providing the ball holder and item 1 providing the rolling groove race. It would be possible to form the groove races as formed in FIGS. 12 and 13 and then assemble the balls and form the end over to retain the components. This would offer the possibility of using 2 pairing of balls with a ball in the center as shown in FIGS. 4e and 4f This would allow more speed, heavier torque loads and less vibration. It would also add to the cost of the part. FIG. 13 shows how the part would be formed if made from solid stock in place of a cylinder, pipe or tube. The end could be formed with the use of upsetting, forging or swaging. If done hot, many of the mechanical properties could be enhanced. The groove races could then be formed in the end if multiple ball pairings are used as per 4e and 4f. The balls and item 1 would then be assembled and the end formed down to encapsulate the item 1 into the finished product as shown in the FIGS. 14 and 15.

Figure 10:
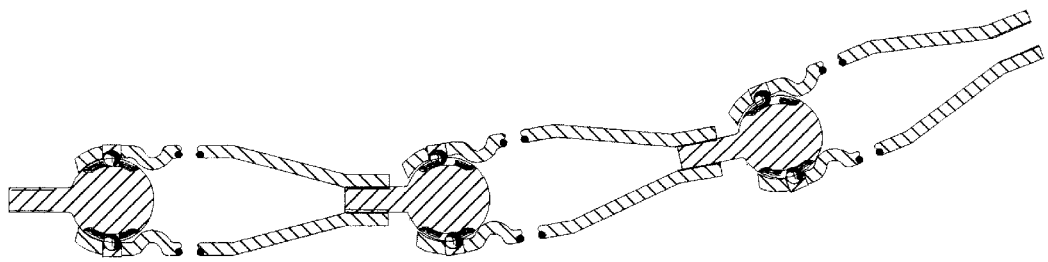
FIG. 10 and FIG. 11 show a method of using more than one constant velocity universal joint to get more degrees of direction change.
Figure 11:
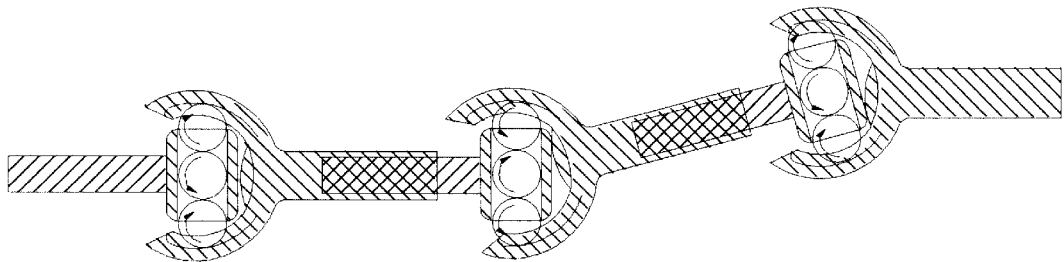

An alternative embodiment is shown in FIG. 6. FIG. 6 shows another method of construction. It would be possible to do this in long form also, but it is envisioned for the individual parts 1 and 2 to be formed and assembled per FIGS. 8a, 8b, 8c, and 8d. Ends of item 1 and 2 could be provided with internal or external threads for attachment. This would allow attaching the joint to other components or run them in groups as depicted in FIGS. 10 and 11. If threads are not placed on the components 1 and 2, other knows means known to the industry could be used.

FIGS. 8a, 8b, 8c, and 8d show a unique assembling method for the embodiment shown in FIG. 6. The 3 balls would be assembled into item 1 as per FIG. 8a. The center ball is smaller to constrain the side movement of the 2 balls used to drive the joint. 2 balls only as shown in FIG. 7 could also be assembled in this fashion. Item 1 is then brought into alignment as shown in FIG. 8b. The FIG. 8c shows the deforming done in the bottom of the holder 2. This deforming allows limited movement as shown in FIG. 8d and therefore confinement of the item 1 and the balls. This would be a simple and cost effective method of assembly.

What I claim is:

1. A constant velocity universal joint comprising:

an outer female part of variable length with a cavity having an inner face provided with outer running grooves arranged in meridian planes relative to a longitudinal outer axis; an inner male part of variable length arranged in said cavity of said outer part and which has outer faces with torque transmitting balls which, in accordance with said outer running grooves are circumferentially distributed in meridian planes around a longitudinal inner part axis; said torque transmitting balls within said inner male part resting against a smaller nested ball providing side constraint and rolling force and thereby establishing a driving connection between said parts.

2. A method of producing the constant velocity universal joint in claim 1, comprising the steps of:

forming a bell shaped said outer female part open at one end having longitudinally extending circumferentially distributed said outer ball tracks on the said inner surface of said outer female part;

assembling said inner male part, said smaller nested ball and said torque transmitting balls;

forming the end of said bell shaped outer female part over the said inner male part and thereby retaining the said inner male part, said smaller nested ball and said torque transmitting balls.

3. A constant velocity universal joint comprising:

an outer female part of variable length with a U shaped cavity having an inner face provided with outer running grooves arranged a meridian plane relative to a longitudinal outer axis; an inner male part of variable length arranged in said cavity of said female outer part and which has outer faces with torque transmitting balls which, in accordance with said outer running grooves are circumferentially distributed in a meridian plane around a longitudinal inner part axis; said torque transmitting balls resting against a smaller nested ball within said inner male part providing side constraint and rolling force and thereby establishing a driving connection between said parts.

4. A method of producing the constant velocity universal joint in claim 3, comprising the steps of:

forming a said female part with said U shaped cavity using hot forming methods common to the industry;

cold coining said outer running grooves on the opposing inner sides of said U shaped cavity to provide the said running grooves with close tolerances;

assembling said inner male part, said smaller nested ball and said torque transmitting balls; deforming the bottom of said U shaped cavity and thereby retaining the said inner male part, said smaller nested ball and said torque transmitting balls.

5. A constant velocity universal joint according to claim 3, wherein the said torque transmitting balls are placed in half spherical ball retainers on the said outer faces.

* * * * *